US006911108B2

(12) United States Patent
Sarmiento

(10) Patent No.: US 6,911,108 B2
(45) Date of Patent: Jun. 28, 2005

(54) PHOTON WELDING DEVICES FOR JOINING PLASTIC PARTS

(75) Inventor: Pedro A. Sarmiento, San Diego, CA (US)

(73) Assignee: Quantum Group, Inc., San Diego, CA (US)

( * ) Notice: Subject to any disclaimer, the term of this patent is extended or adjusted under 35 U.S.C. 154(b) by 0 days.

(21) Appl. No.: 10/037,414

(22) Filed: Jan. 4, 2002

(65) Prior Publication Data

US 2003/0094240 A1 May 22, 2003

Related U.S. Application Data

(60) Provisional application No. 60/260,012, filed on Jan. 6, 2001.

(51) Int. Cl.[7] .............................................. B32B 31/20
(52) U.S. Cl. ............................. 156/272.2; 156/379.8; 156/580; 219/243; 219/385
(58) Field of Search ........................... 156/379.6, 379.8, 156/580, 272.2; 219/243, 385; 250/504 R; 362/551, 580, 581

(56) References Cited

U.S. PATENT DOCUMENTS

| 4,233,493 | A | * | 11/1980 | Nath ............................ 606/16 |
| 4,636,609 | A |   | 1/1987  | Nakamata |
| 5,278,731 | A | * | 1/1994  | Davenport et al. ......... 362/551 |
| 5,426,308 | A | * | 6/1995  | Sudduth et al. ......... 250/504 H |
| 5,840,147 | A |   | 11/1998 | Grimm |
| 5,843,265 | A |   | 12/1998 | Grimm |
| 6,596,122 | B1 | * | 7/2003 | Savitski et al. .......... 156/304.2 |

* cited by examiner

*Primary Examiner*—John T. Haran
(74) *Attorney, Agent, or Firm*—Christie, Parker & Hale, LLP

(57) ABSTRACT

Photon welding devices of this invention comprise a non-coherent photon source, and a light pipe coupled to the photon source at one end. A thin mask is positioned at another end of the light pipe that defines a weld location for photon delivery. A work piece to be bonded by the device comprises a top layer of transparent plastic and a base layer of absorbing plastic. The thin mask is in the form of a reflective coating positioned on the end of the light pipe over all surfaces that are not in contact with the work piece. A device includes a member that imposes a controlled, compressive force to the work piece while it is being welded and during a short time thereafter. The device also includes a member that maintains a desired alignment of the light pipe, top layer of the work piece, and base layer of the work piece during the bonding cycle.

48 Claims, 12 Drawing Sheets

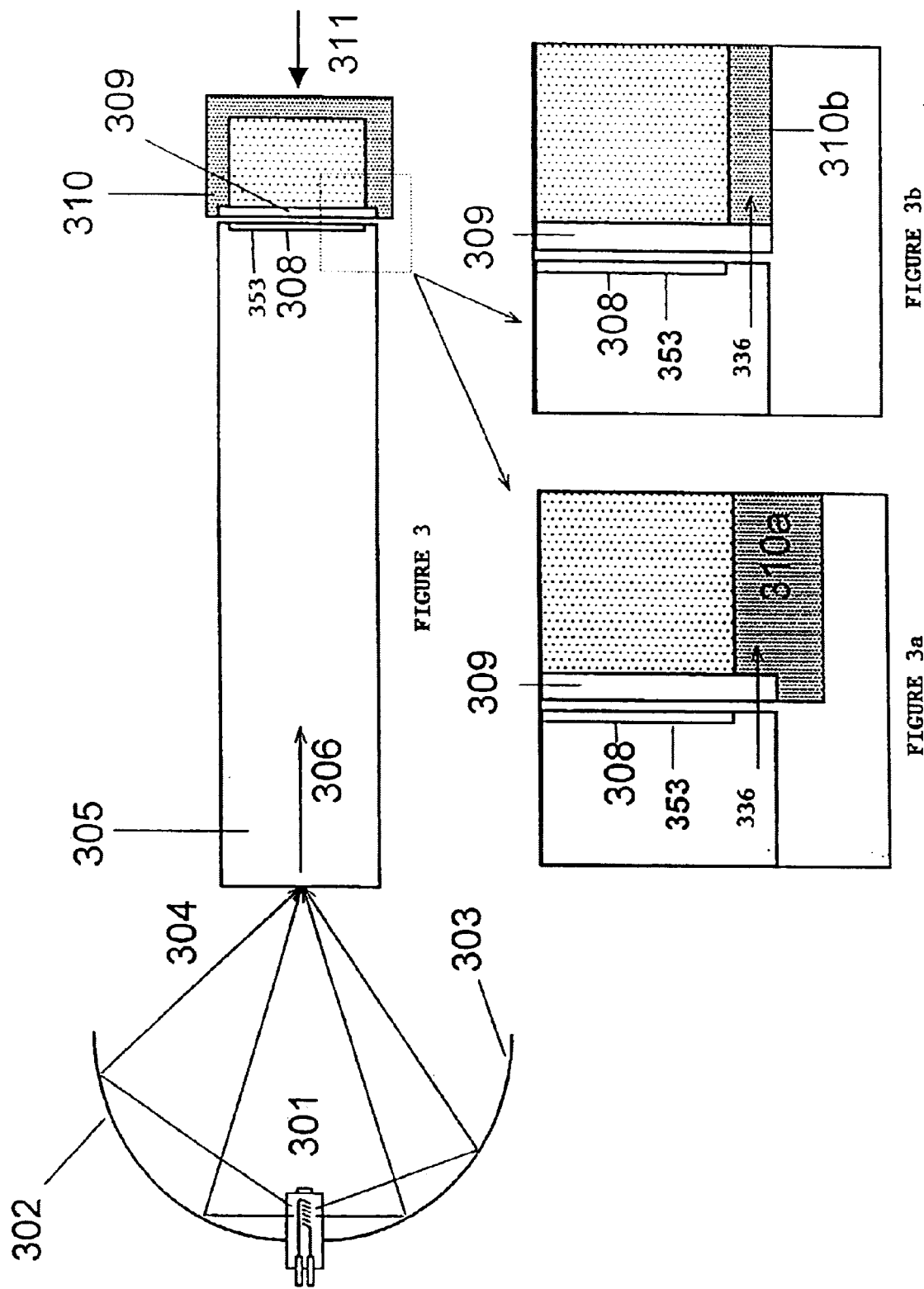

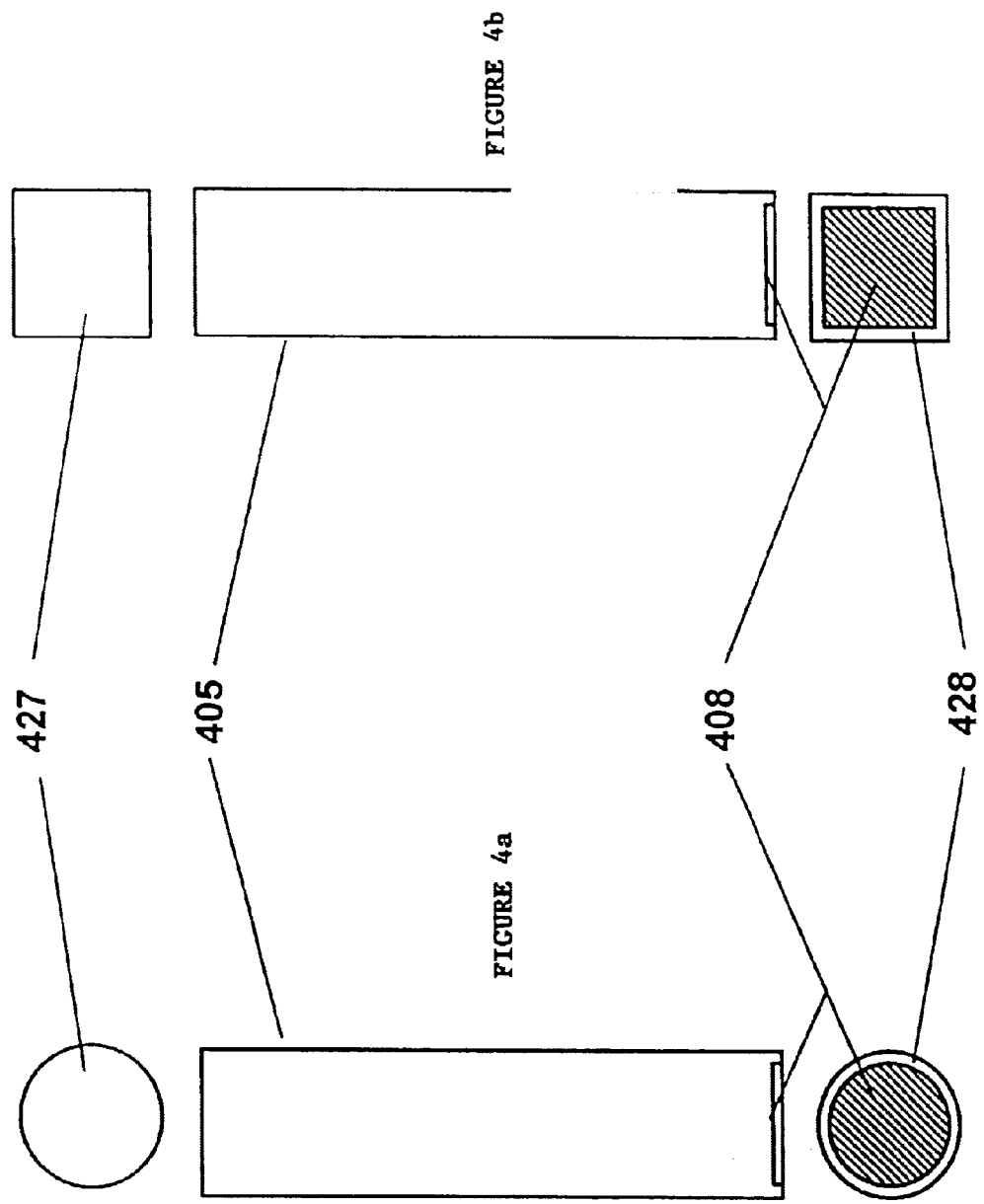

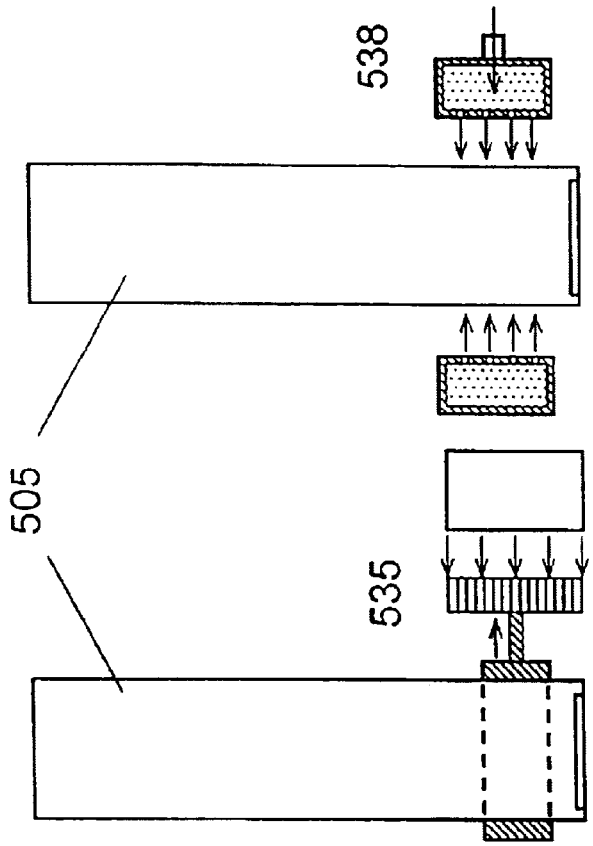
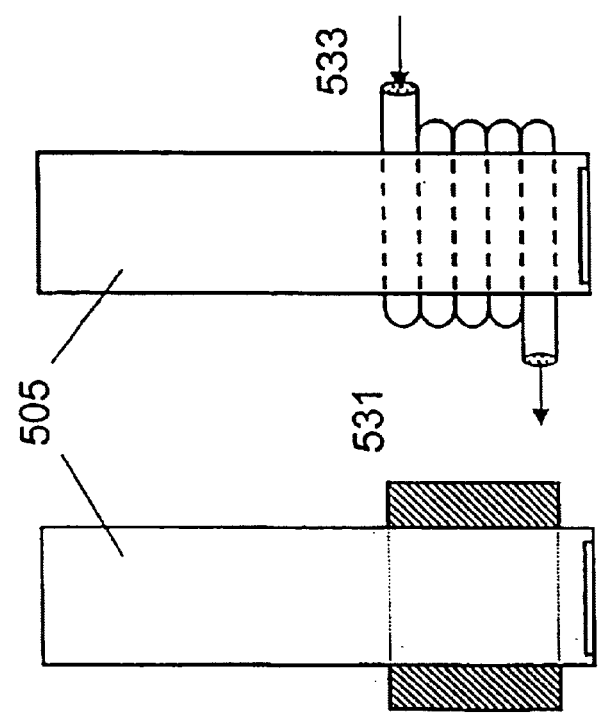
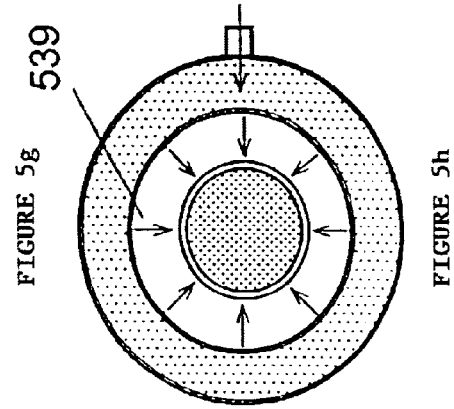
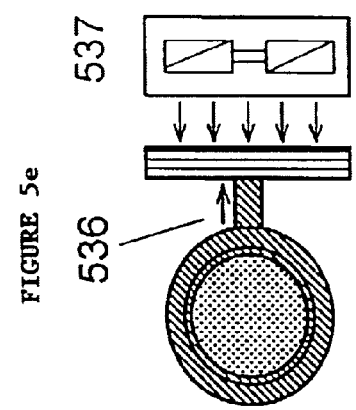
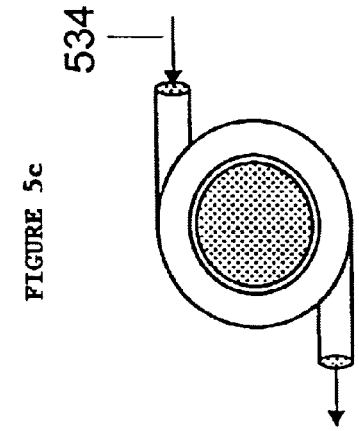
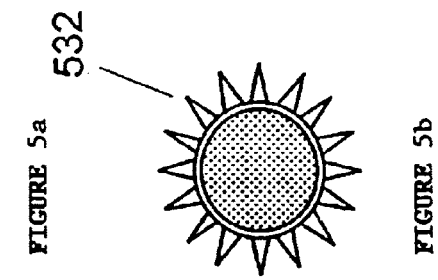

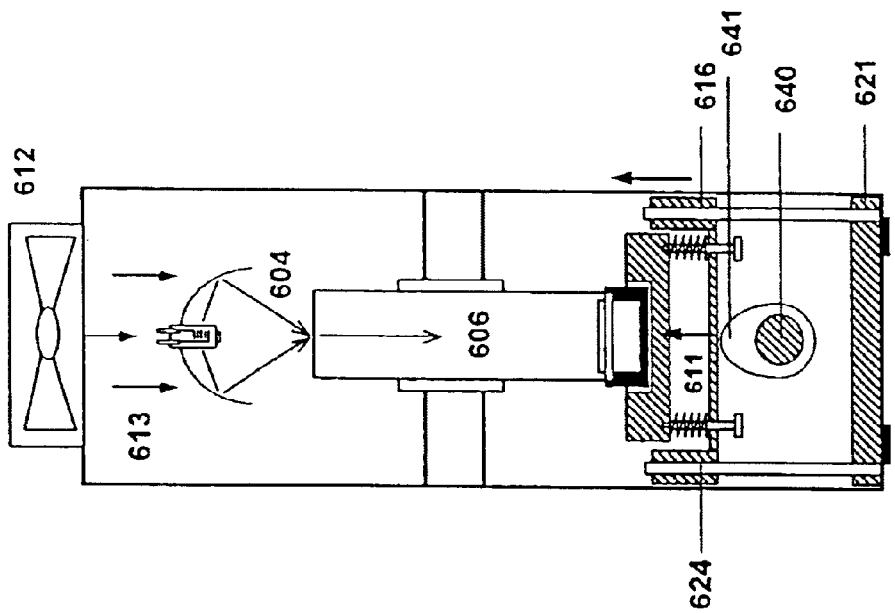
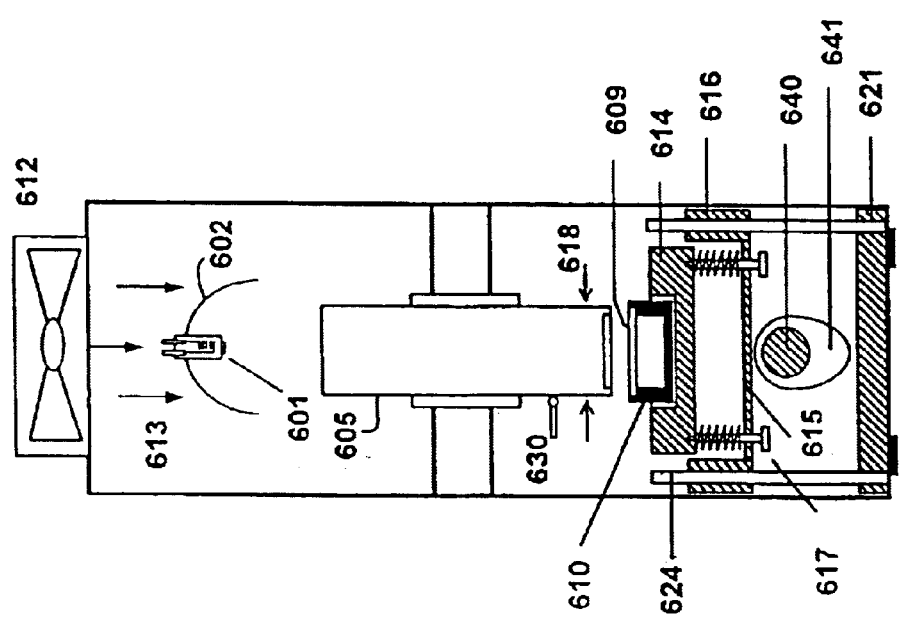
Figure 6a
Figure 6b

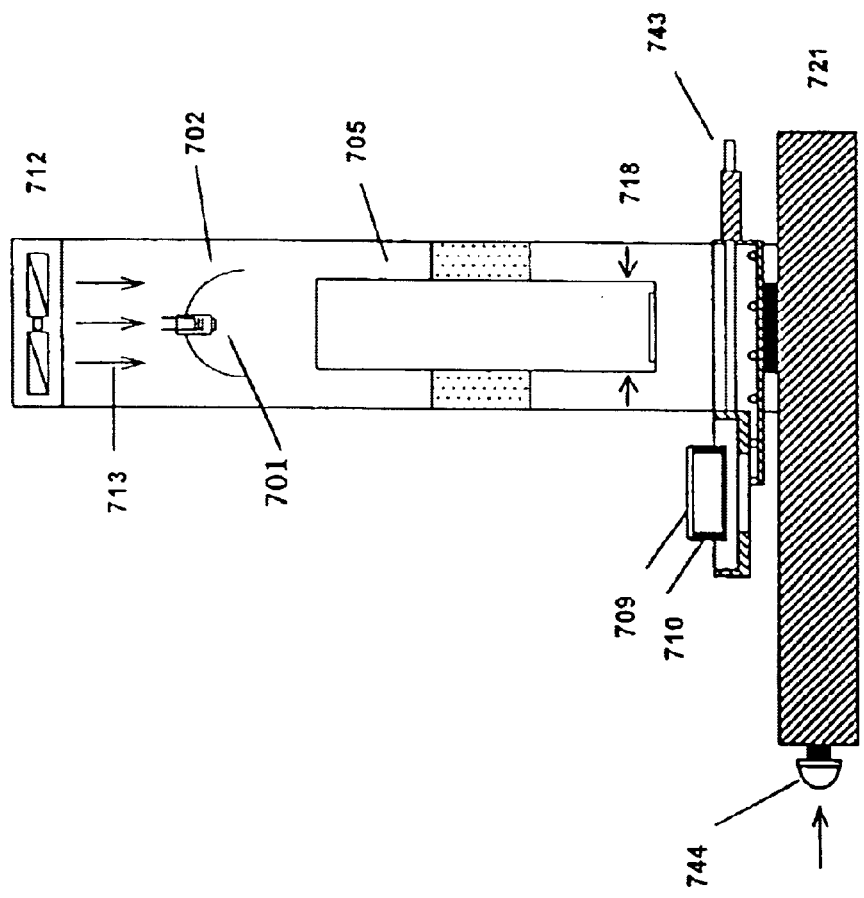
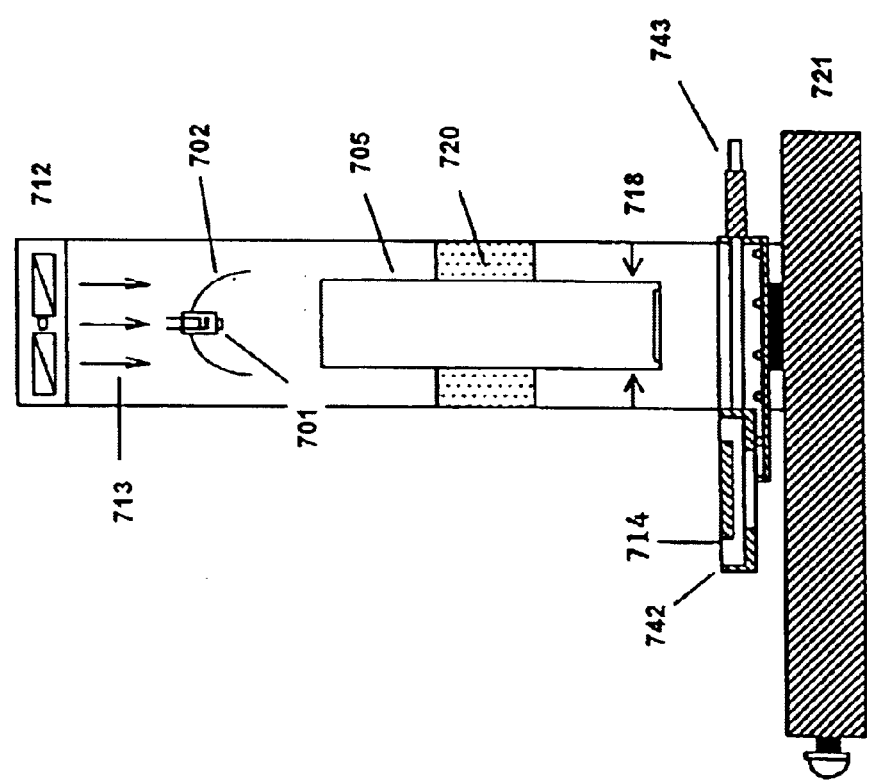
Figure 7b
Figure 7a

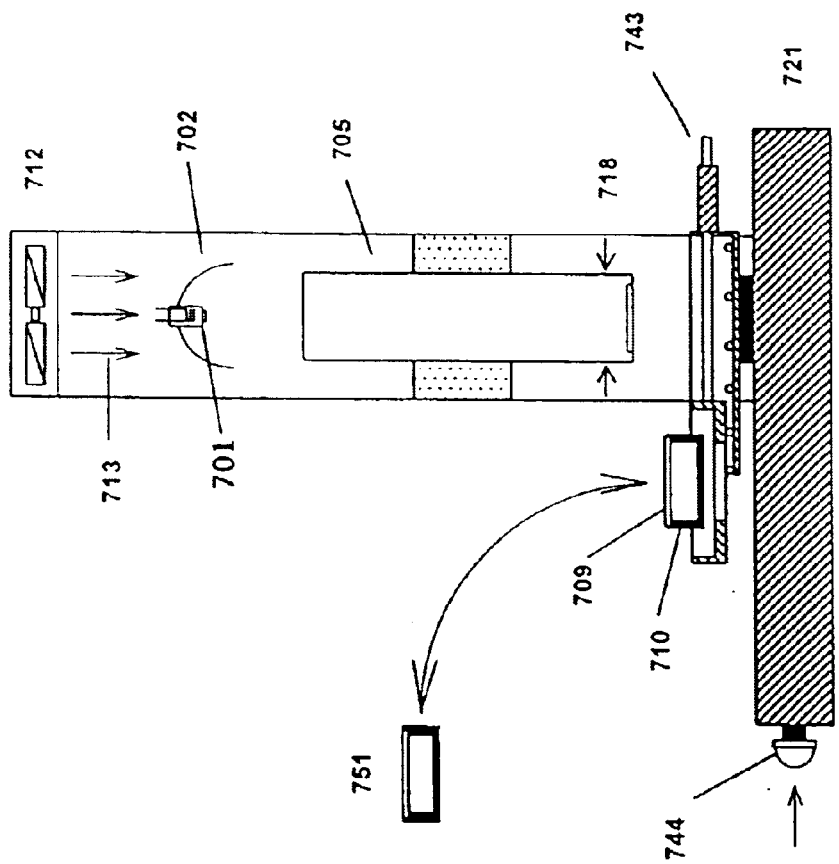
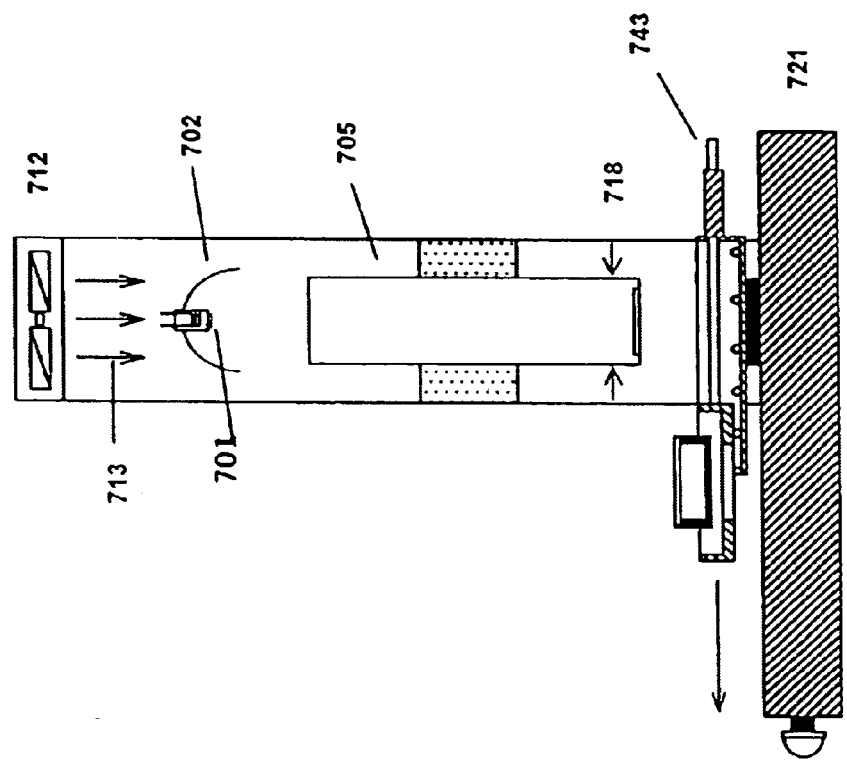
Figure 7h
Figure 7g

PHOTON WELDING DEVICES FOR JOINING PLASTIC PARTS

CROSS REFERENCE TO RELATED APPLICATION(S)

This application claims priority of U.S. Provisional Patent Application No. 60/260,012 entitled "PHOTON WELDING DEVICES FOR JOINING PLASTIC PARTS," filed on Jan. 6, 2001, the contents of which are hereby incorporated by reference.

BACKGROUND OF THE INVENTION

The present invention relates to an apparatus for welding plastic parts, and more specifically, for devices to weld plastic parts using Through Transmissive Infrared Radiation (TTIR).

Typically, plastic assemblies can be welded together by one of the many methods for welding or joining plastics currently available. These methods include ultrasonic welding, adhesives, fasteners, friction, hot plates, induced welding, microwave welding, or radiant heaters. Although these methods sometimes produce welds of adequate strength, often they are not adequate and each has some drawbacks. For example, vibration during frictional welding can damage installed electronic devices or the plastic pieces. Furthermore, part size and positioning accuracy are limited because one part must move relative to the other during the procedure. Melt residue deposited on hot-plate tooling requires frequent cleaning. On the other hand, the relative high temperatures required for non-contact, radiant heaters could degrade materials at the weld joints or overheat sensitive electronics.

Other methods used to weld plastics include the use of coherent light sources like lasers (Nakamata), or non-coherent light sources like halogen lamps (Grimm et al).

Nakamata (U.S. Pat. No. 4,636,609 "Process for joining different kinds of synthetic resins.") shows a TTIR method of joining different plastics by using a substrate plastic doped with an absorbing element (e.g. carbon) to decrease the transmissivity of the plastic and thus absorb the energy, produced by the radiant source. The energy absorbed by the substrate plastic generates enough heat to bring the component to its melting point. Because the substrate plastic is in intimate contact with another piece of the same material (but without an absorbing element), when the substrate melts, so does the other component (this component is typically transparent). Radiant energy from the monochromatic source (a laser) is directed through the transparent plastic to the substrate plastic. Heating in the substrate plastic is transferred to the transparent plastic by conduction in the area where both components meet. When both the substrate and the transparent component are melted, the two pieces are pressed together, the source of radiation is terminated, and then the assembly is allowed to cool producing a satisfactory weld.

A laser is the only radiant source specified in this patent. A neodymium-doped YAG (Yttrium Aluminum Garnet) laser with a radiant output at a wavelength of 1060 nm (nanometers) is the most suitable according to the inventor. A neodymium-doped glass laser, a ruby laser, a helium-neon gas laser, a krypton gas laser, an argon gas laser, a hydrogen gas laser, or a nitrogen gas laser may also be used. Nakamata contends that laser radiation sources with a wavelength of 1060 nm (the neodymium-doped YAG wavelength) or less is necessary. Wavelengths longer than the aforementioned 1060 nm cannot be transmitted through the otherwise transparent plastic according to the inventor.

Nakamata teaches that 5 to 100 watts of laser power are necessary to affect satisfactory welds. No melting occurs at power levels less than 5 watts, and laser power levels in excess of 100 watts may vaporize or significantly alter the properties of the transparent plastic.

Grimm is the inventor of two related TTIR method patents (U.S. Pat. Nos. 5,840,147 and 5,843,265) assigned to the Edison Welding Institute and licensed to Quantum Group Inc. Grimm utilizes a similar scheme as Nakamata to bond two plastic pieces. That is, a base layer of plastic is absorbing and is heated by incident radiation. A second plastic piece, which is to be bonded to the base layer, is essentially transparent to the radiation employed and is placed on top of the base layer. Incoming radiation, as in Nakamata, is routed through the almost transparent top piece and into the absorbing base layer. Bonding occurs when the base piece melts at the interface with the top piece. Pressure is applied to press the two parts together, the radiation is terminated, and the assembly is allowed to cool. Grimm's bonding method is similar to Nakamata's except for the radiation source. Nakamata employs a laser, and Grimm uses a source of non-coherent electromagnetic radiation.

Grimm utilized a source of, non-coherent electromagnetic radiation, a quartz-halogen-tungsten lamp, which can be described as an approximately gray body emitter. Grimm cites a problem with his radiation source, his source is a broadband emitter that generates substantial amounts of long wavelength IR (Infrared) that are absorbed in his supposedly transparent plastic piece. This causes the same problem that Nakamata . experienced in his transparent plastic with high power lasers (power levels greater than 100 watts). Grimm employs the inventive step of utilizing an extra piece of transparent plastic placed between his source and the work piece to absorb the long wavelength energy. Grimm devises a method of cooling (forced convection) this extra piece of plastic to dissipate the heat generated in this kind of filtering technique.

The technique of Nakamata and Grimm may be employed for critical bonding applications providing the thermal energy delivered by the welding process can be limited. A very narrow bond line is a practical method of achieving hermeticity at limited power levels. Nakamata's sealing method can provide a narrow bond line because of the non-diverging nature of a laser beam (i.e. a laser with a wavelength of 808±10 nm has a 0.8 mm beam diameter). Grimm, however, provides a wider beam by using a lamp and reflector system with the weld at the focal length of the lamp/reflector system. In both of these approaches, either the optical source or the work piece (or both) must move in the appropriate trajectory to accomplish the bond at the required location. The correct amount of compression force for the requisite amount of time must follow the beam, and this requires complicated, automated tooling or robotic systems. In this approach, furthermore, there is an inherent discontinuity at the starting point and at the ending point of the weld, which may effect the quality of the product. Goldstein and Tolley disclosed a TTIR method using a photon reflecting mask in U.S. patent application Ser. No. 60/116,575 Filed Jan. 21, 1999 and 09/488,887 Filed Jan. 21, 2000.

SUMMARY OF THE INVENTION

This photon welding apparatus, which is capable of producing a narrow or controlled bond line, is used to bond a transparent or translucent plastic top layer to a base piece molded of a plastic that contains carbon or similar material to absorb incident photon energy. In an example the base piece consists of a cavity that may contain sensitive chemicals, membranes, or other vulnerable components. The base geometry is not limited to a circular structure; this photon welder readily processes square, rectangular, polygonal or other geometrical shapes. It is convenient that the vertical wall of the cavity contain an interior shoulder or ledge on which the transparent or translucent top or cap rests. The cap may be molded, or it may be blanked out of plastic sheet. If the internal ledge for positioning the cap is not feasible, external fixturing to keep the two parts of the assembly in registration may be employed.

Photon energy (produced by a non-coherent light source) is introduced in a very specific pattern around the periphery of the package along with a compressive force exerted by a light pipe or a thin mask. The light pipe is made of fused silica (silicon dioxide) or other suitable material, and may be round, square or any other geometry. The end of these light pipes is machined so that a thin raised section of quartz conforms to the weld location desired and can be as little as a fraction of a millimeter wide, at the package's periphery. The width of the thin raised section is governed by the width of the weld bond desired. The raised section of the light pipe, about 1 mm high, is in contact with the cap during the weld cycle and transmits photon energy from the light pipe into the transparent or translucent layer. All surfaces at the end of the light pipe that are not in contact with the work piece are coated with a metallic (gold, silver, aluminum, chrome, etc.) reflecting layer. This reflecting layer returns photons not participating in the weld back to the optical source. Therefore, in this process photon energy is delivered in a precise pattern by this optical mask to the work piece to generate the desired narrow controlled bond line.

A convenient photon source is a quartz halogen tungsten lamp which is optically coupled to the free end (machined flat and fire polished) of the light pipe with the aid of an elliptical, parabolic, or other suitable reflector structure. These lamps exhibit spectra that peak in the infrared at about 1000 nm for filament temperatures about 3000 K and can be used to produce quality welds in the apparatus described. Lamp life may be prolonged by operating the lamp at reduced power and still obtain satisfactory welds.

In addition to photon energy, a compressive force must be applied to the two components being bonded. This compressive force is applied during the bonding step and for a short period measured in seconds after the photon radiation ceases. One of several methods that can be utilized to apply a compressive force consists of placing the components to be bonded into spring loaded nests. The components are then brought into direct contact with the free end of the light pipe structure. As the springs are compressed, the force required for a proper weld is then applied on the components and precisely only on the areas to be welded. Data collected through a lot of experimentation indicates that forces of about 45 N (Newtons) are needed for components within 25 to 30 mm in overall width or diameter. The light pipe and photon source may move and apply the compression force to the work piece. Alternatively, the work piece may move and be compressed against the masked end of the light pipe with a calibrated force. Air cylinders, solenoids, springs, cams or similar mechanical actuators may provide the controlled force.

A number of system parameters must be controlled for satisfactory bonds, these parameters include exposure time, initial component temperature, compressive force applied, temperature of the light pipe, and level of irradiance applied. For example, the compression force applied to a work piece of about 25 mm diameter and a thickness of 1 mm during and after the bonding process must be maintained at 45 N. The same part requires photon exposure times of 10 seconds and a post-weld compressive force to be maintained for an extra 5 seconds to allow stress relief of the bond. Experiments have shown that if the same components are preheated to 110° C., than the exposure time for bonding can be reduced to about 5 seconds with a post-weld force to be maintained for only 3 seconds. The temperature of the light pipe and mask is another parameter that must be controlled. Testing in this area suggest that the light pipe's temperature affects the quality of the weld as well as the component in contact with it. These same tests indicate that light pipes are to be maintained at temperatures no greater than 70° C. at the beginning of the weld cycle. To control the light pipe's temperature, after a weld, a cooling gas, circulating liquid, forced convection, or related cooling means may be employed to lower the light pipe temperature to an acceptable level in a timely manner. Levels of irradiance of about 15 to 20 W/cm$^2$ 2 (for a wavelength range between 400 to 1100 nm) are required to bond components such as the ones described above. Comparisons performed between components bonded with different systems including ultrasonic and laser indicate that photonic welds are stronger, cleaner, and more consistent than welds performed with other methods. Yields of 99% were easily achieved with photonic welding systems. Ultrasonic methods yielded results as low as 70% with overall questionable weld consistency and low strength at the bond line. Laser welds were performed using a bundle of optical fibers conformed in the shape of the welding area of the components. A sample of these components were welded and then tested in house and results indicated that 14 to 28% of the components were improperly welded or had very weak bond lines. In general, however, the simplicity of the photon welding system is superior overall to the other systems tested even though some of them were faster. The data in the description below show the advantages of the TTIR photon welding system.

BRIEF DESCRIPTION OF THE DRAWINGS

The novel features of this invention will become more apparent from the following taken in conjunction with the accompanying drawings, and in which:

FIG. 3 is a cross-sectional view showing a radiant source bonding two components of the work piece in accordance to the basic embodiment of the process according to the present invention;

FIG. 3a is a detailed view of an embodiment of the bottom component of FIG. 3 and FIG. 3b is a detailed view of an alternative embodiment of a bottom component.

FIGS. 4a and 4b are cross-sectional views of two light pipes designed to conform to the principles established in the present invention and FIGS. 4c and 4d are end views of the respective masked ends of the light pipes of FIGS. 4a and 4b;

FIGS. 5a, 5c, 5e and 5g are cross-sectional views showing various cooling schemes for the light pipes and FIGS. 5b, 5d, 5f and 5h are end views of the respective cooling schemes;

FIGS. 6a and 6b are cross-sectional views showing a third apparatus designed with the principles described in the present invention;

FIGS. 7a through 7h are cross-sectional views showing a step-by-step welding process of a fourth apparatus designed with the principles described in the present invention;

DETAILED DESCRIPTION OF THE PREFERRED EMBODIMENTS

Figure 1B:
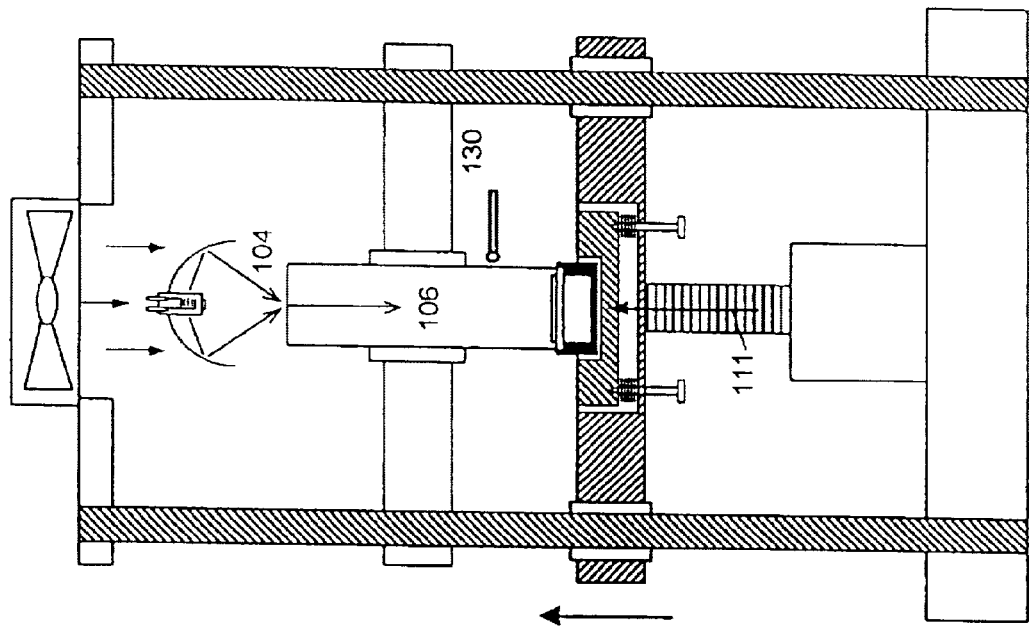
FIGS. 1a and 1b are cross-sectional views showing an apparatus designed with the principles described in the present invention.
Figure 1A:
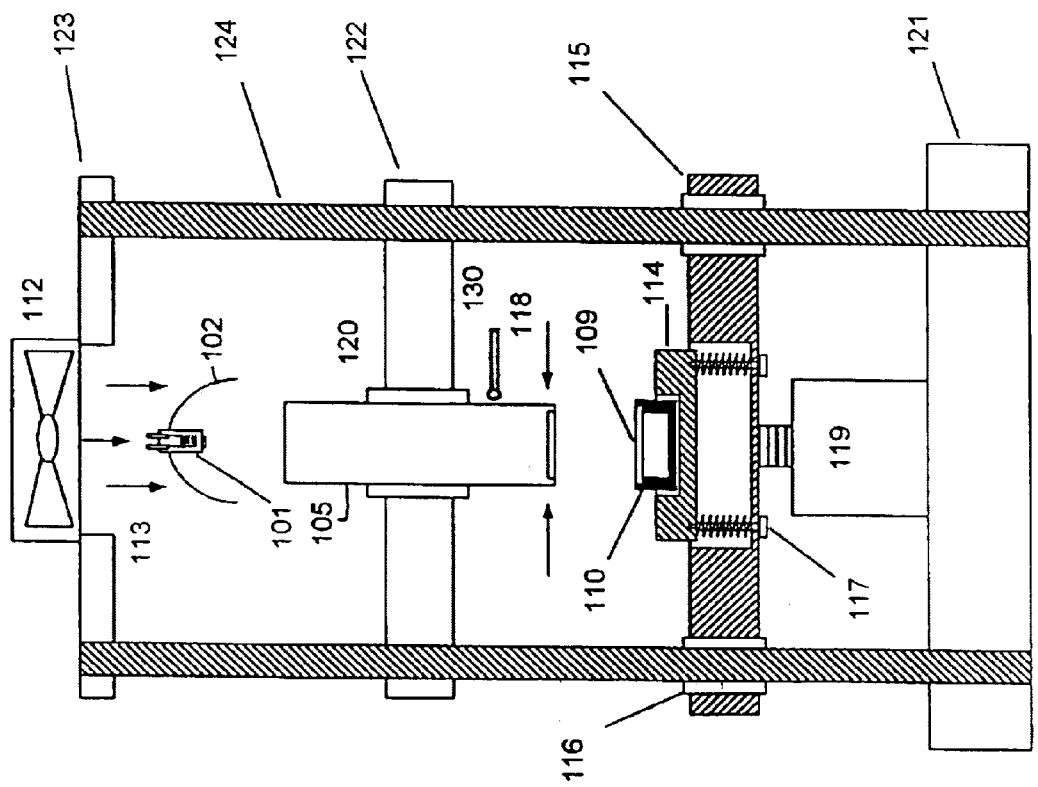

FIGS. 1a and 1b show an embodiment of a photon welder, which comprises several features of the current invention. A component 110 made with highly absorptive radiation characteristics, is placed in intimate contact with another component 109 that allows transmission of radiant energy into a nest or base 114 with means to provide a force 111 (FIG. 1b), which could be provided by springs 117, or a linear actuator or other device that will produce the same result. A movable plate 115 provided with bushings 116 is pushed upward by a pneumatic piston 119 as FIG. 1a shows. The plate carries the nest 114 upward in a linear motion and maintains alignment to a light pipe 105 or a thin mask composed of a transparent material such as silicon dioxide and a reflective material placed on all locations except where the welding of the components is desired. The plate moves along shafts 124 extending from a base 121 to aid on the alignment of the components to be welded and the light pipe or thin mask. When in contact with the shaped and masked end of the light pipe 105, the movable plate 115 activates a contact switch or a proximity sensor (not shown) which turns on the light source 101 supported by a plate 122. An elliptical reflector 102, directs light produced by the source towards the light pipe 105. Supported by a retaining plate 123, a fan 112 provides cooling 113 to the reflector 102 continuously. As shown in FIG. 1b, radiation 104, impinging on the entrance of the light pipe 105, travels through the pipe 106, through the exit of it, and then through the first component 109 that comprises part of the assembly to be bonded. Finally, the radiation is absorbed by the second component 110 of the assembly causing it to melt and transfer energy upward to the top component by convection and conduction, which melts a portion of the top component. The melted area cools to a bond during a dwell time of 1 to 4 seconds. Upon completion of the weld, a timed controller (not shown), retracts the movable plate 115 to its original position as shown on FIG. 1a. To prevent over-welding or the melting of plastic components (distorting the exterior surfaces), the temperature of the light pipe is controlled by a temperature sensor 130, which activates a fan or blower 118 providing cooling air to the exit end of the light pipe.

Figure 2B:
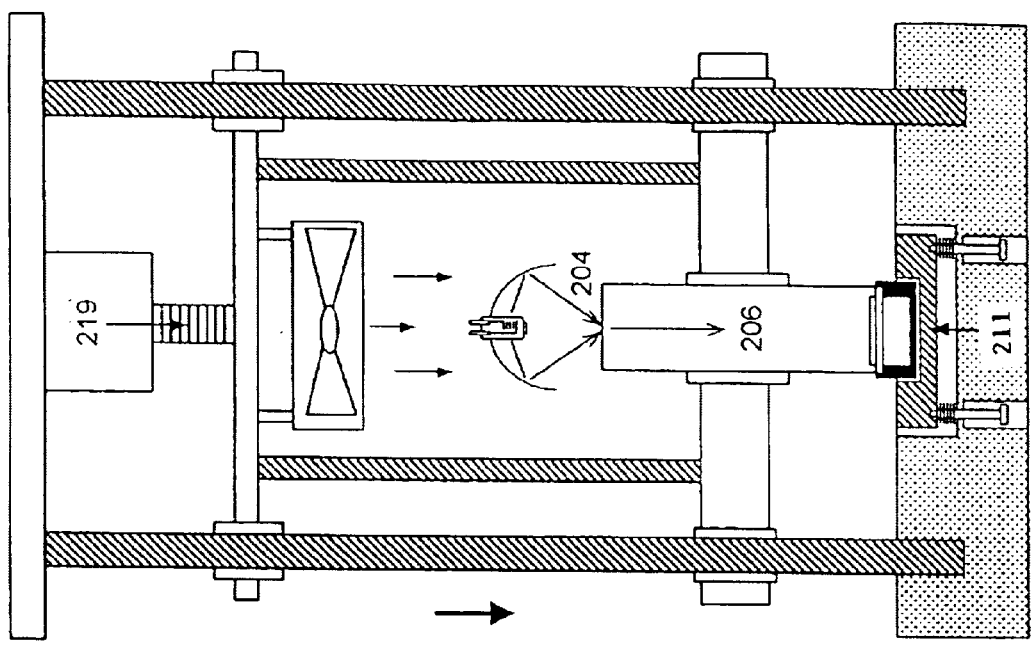
FIGS. 2a and 2b are cross-sectional views showing a second apparatus designed with the principles described in the present invention.
Figure 2A:
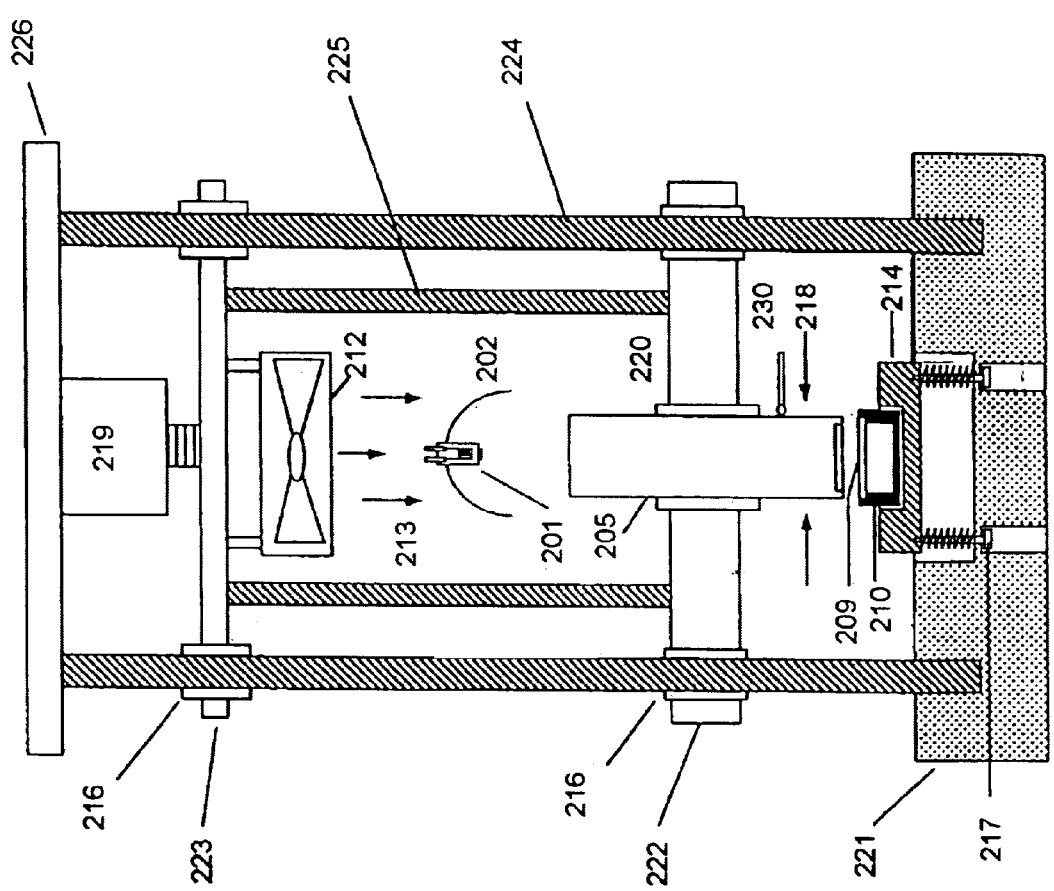

FIGS. 2a and 2b show another embodiment of a welding device designed with the principles established by the invention. On this version, the linear motion is provided to a light pipe 205, a light source 201, a reflector 202, and a fan 212, by a piston 219 located on a retaining plate 226. A movable plate 223 provided with bearings 216 slides downwards on shafts 224, extending from a base 221, simultaneously with the a movable plate 222. When the plates slide downward (FIG. 2b), the light pipe 205 with its shaped and masked end comes in contact with the components to be bonded 209 and 210 in a nest 214 with means to provide a force 211 (FIG. 2b) with springs 217 (FIG. 2a). As the plates 222 and 223 move downward, a contact switch or a proximity sensor (not shown) activate the light source 201. Light produced by the source 201 is directed by the elliptical reflector 202, towards the light pipe 205. The fan 212 provides cooling 213 to the reflector 202 continuously. Radiation 204 (FIG. 2b) impinging on the entrance of the light pipe 205 travels through the pipe 206 (FIG. 2b) the exit of it, and then through the first component 209 that comprises the assembly to be bonded. Finally the radiation is absorbed by the second component 210 of the assembly causing it to melt and thus bond with the first component of the assembly. Upon completion of the weld, a timed controller (not shown), retracts the movable plate assembly (222/223 and connecting shafts 225), to its original position as shown on FIG. 2a. To prevent over-welding or the melting of plastic components, the temperature of the light pipe is controlled by a temperature sensor 230, which activates a fan or blower 218 providing cooling air to the exit end of the light pipe.

FIGS. 3 through 3b illustrate a third embodiment of the invention. A quartz-halogen tungsten lamp 301 (typically 410 to 1000 watts in machines, although not limited to these powers) includes an elliptical reflector 302 coated with highly reflective material 303 (aluminum or gold coated onto elliptical metal reflector). Photons 304 reflected by the walls of the metal reflector is directed towards the entrance of a light pipe 305 made of fused silica (quartz). Photons 304 produced by the light source 301 travel the length of the entire light pipe 306. An exit is provided for the photons 304 at predetermined areas at the end of the light pipe 305. A highly reflective material 353, acting as a mask 308, placed at the end of the light pipe prevents photons from exiting through unwanted areas.

With a top plastic component 309 in intimate contact with a bottom plastic component (e.g. in the form of an L-shaped recess 310a (FIG. 3a) or a butt joint 310b (FIG. 3b) and held clamped between the light pipe and a base (not shown) a force 311 is applied, the light source 301 is energized, the photons 304, reflected by the reflector's surface 303, are transmitted by the light pipe 305 through an unmasked area 336 and through the material of the top component 309, and finally absorbed by the material of the bottom component 310. Because both the top plastic component 309 and the bottom plastic component 310 are in intimate thermal contact, when the bottom photon absorbing plastic component 310 melts, the top transparent plastic component 309 melts too as the heat is transmitted to it by conduction and convection.

FIGS. 4a and 4b depict two basic light pipe configurations where a point of entry is provided for the light 427, a path 405 for the light is provided, and a masked area 408 to prevent radiation from striking unwanted sections is placed at the point of exit of the light pipe. The masked area of the light pipe is coated with a highly reflective material such as gold or aluminum. The weld location 428 is determined by a small area on the periphery of the quartz light pipe, which is not coated with reflective material (FIGS. 4c and 4d).

FIGS. 5a through 5h describe several embodiments of this invention, which provide thermal management to an end of a light pipe 505 because the light pipe absorbs heat during each weld. These embodiments include (FIGS. 5a and 5b) the use of heat dissipaters or heat sinks 531 provided with radial fins 532; FIGS. 5c and 5d show a water cooled heat exchanger 533, wrapped around the light pipe with water 534, forced through it to maintain the temperature of the light pipe at appropriate levels; heat pipes 535 (FIGS. 5e and 5f) can be utilized along with a fan 537 to help remove the heat from the light pipe 536, thus cooling the light pipe; and FIG. 5g and 5h show an annulus 538, where compressed air is channeled through openings to cool the light pipe 539.

FIGS. 6a and 6b depict a manual welding device based on the principles established by the invention. A component 610 made with high absorptive radiation characteristics, is placed in intimate contact with another component that allows transmission of radiant energy into a nest 614 with a means to provide a force 611 (FIG. 6b) with springs 617 or other device that will produce the same result. A movable plate 615, provided with bushings 616, is pushed upwards by a cam 641 mounted on a shaft 640 turned manually. As FIG. 6b shows, the plate carries along the nest 614 upward in a linear motion and maintains alignment to the light pipe by shafts 624 extending from a base 621. When in contact with a shaped and masked end of a light pipe 605, the movable plate 615, activates a contact switch or a proximity sensor (not shown) which turns on light source 601. Light produced by the source is directed by an elliptical reflector 602, towards the light pipe 605. A fan 612 provides cooling 613 to the reflector 602 continuously. Radiation 604 (FIG. 6b), impinging on the entrance of the light pipe 605, travels 606 through the pipe, the exit of it, and then through the first component 609 that comprises the assembly to be bonded. Finally the radiation is absorbed by the second component 610 of the assembly causing it to melt and thus bond with the first component of the assembly. Upon completion of the weld, the operator moves the crank (not shown) in the opposite direction and allows the movable plate 615, to retract to its original position as shown in FIG. 6a. In order to prevent over-welding or the melting of the plastic components, a temperature sensor 630 initiates cooling. A small fan 618 (FIG. 6a) provides cooling air to the exit end of the light pipe.

Figure 7D:
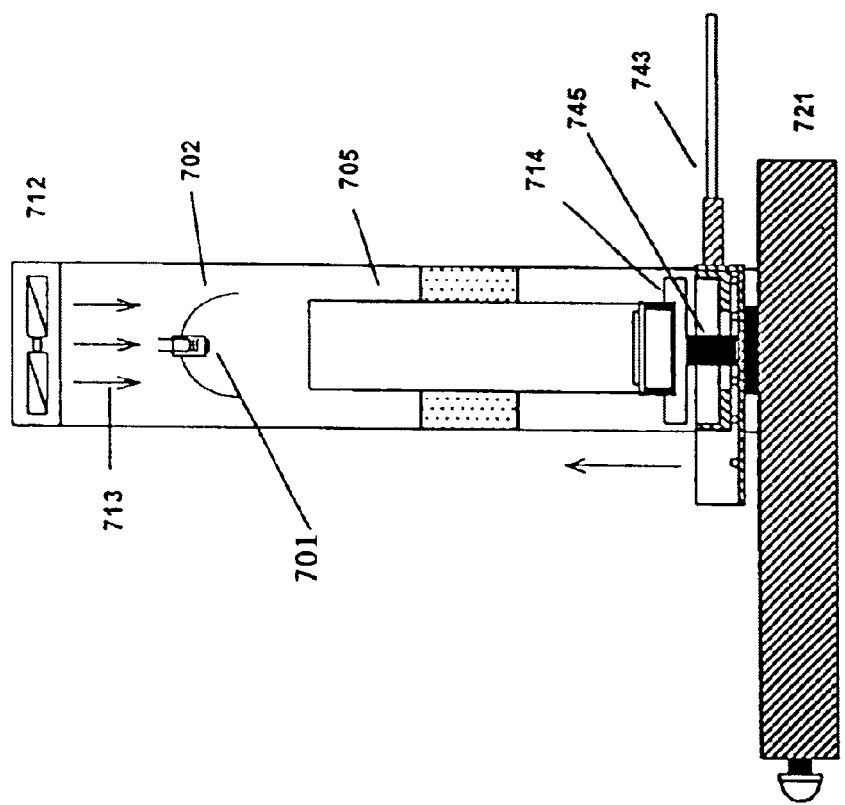
Figure 7C:
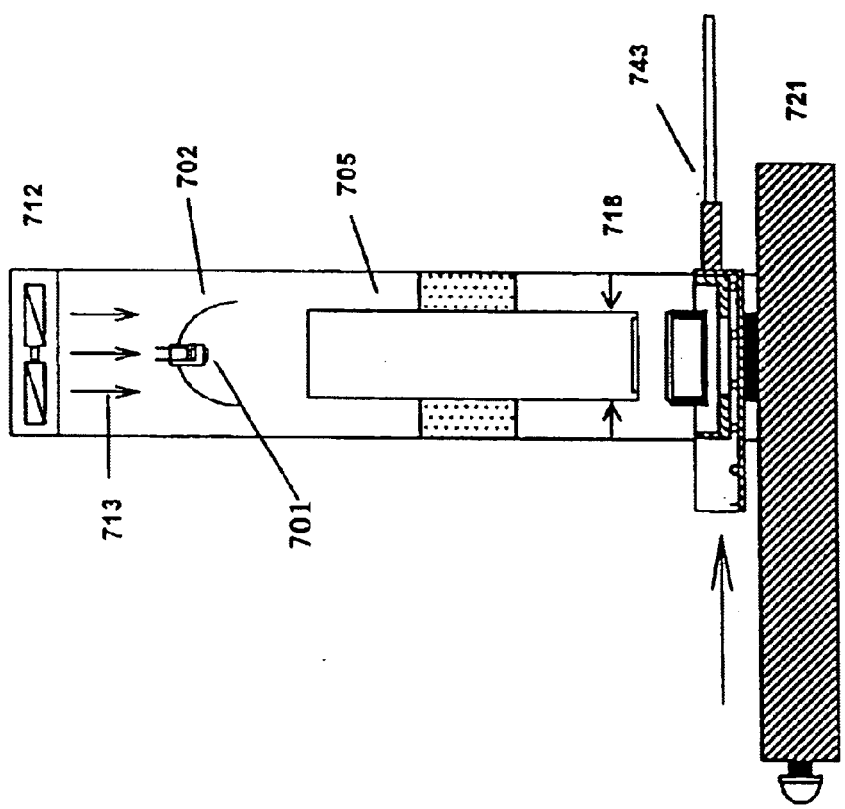
Figure 7F:
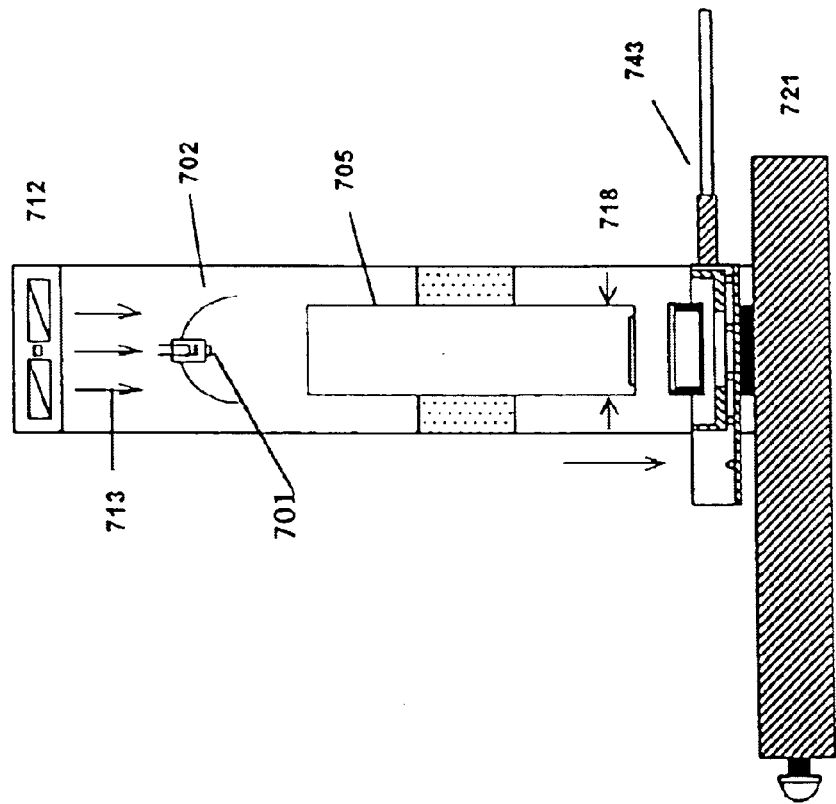
Figure 7E:
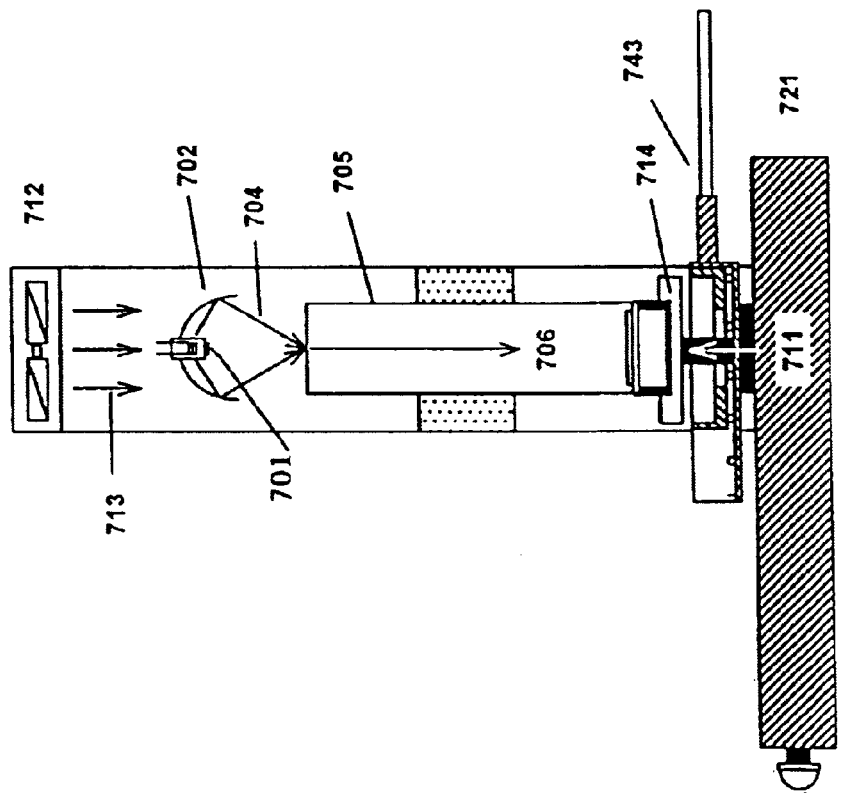

FIGS. 7a through 7h present another welding apparatus where a light pipe 705 remains in a fixed position, while a linear actuator 745 (FIG. 7d), provides a linear motion to a nest 714, held in a drawer-like fixture 742. The figures depict the step-by-step process required to complete the welding of two components in this embodiment. FIG. 7a presents the device in its initial position right after power has been turned on. Both a reflector's cooling fan 712, and a light pipe cooling mechanism 718 are on at this point. Sensors (not shown) provide feedback to the system to activate a pneumatic piston 743 to move the drawer mechanism 742 along a base 721, out and away from the welding area. The drawer mechanism holds the nest 714. The nest holds components to be welded 709 and 710 (FIG. 7b). Upon loading the nest with a work piece assembly (FIG. 7b) containing both the transparent component 709 and the absorptive component 710, the operator pushes a momentary switch 744, to initiate the welding process. When a sensor (not shown) ascertains that the work piece is in the correct position, the pneumatic piston 743 returns the drawer 742 back to its position within the welding area. The linear actuator 745, or a similar device that provides the same motion lifts the holding nest 714, to the welding position (FIG. 7d). This action is sensed by yet another sensor (not shown) which stops the cooling mechanism to the light pipe 718. In this position, the linear actuator 745 provides the required clamping force. As the shaped and masked end of the light pipe contacts the plastic assembly consisting of the transparent component 709, and the absorptive component 710 a proximity sensor or a mechanical switch (not shown) triggers a radiant source 701 on. A timer (not shown) provides the mean to control the time the plastic components are to be irradiated. The fan 712, provides continuous cooling 713 to a reflector 702. A temperature probe 730 (not shown) attached to a temperature control (not shown) provides feedback to a programmable device (not shown). When the welding is complete, the linear actuator lowers the components (FIG. 7f), which triggers the light pipe cooling mechanism 718 on. The pneumatic piston 743 moves the drawer-like mechanism 742 out and away from the welding area. The operator removes welded plastic components 751 from the holding nest 714, and inserts a new pair of components to be welded (FIG. 7h). The cycle is repeated when the operator pushes the momentary switch 744.

Because of their simple nature, welding machines designed using the principles established in the invention are ideal for fully automated systems. An electronic control box provided with a touch panel (not shown), allows full programming of the step-wise welding process presented on FIG. 8. A conveyor belt-driven system 800 in combination with miniature pneumatic pistons and sensors is utilized to move the components to be welded. Unwelded plastic components are assembled and then placed on holding nests 801. The conveyor moves the nests under a pre-heating system 802 for some pre-determined time, then under a photonic welder 803, where bonding is performed. Bonded components exit the welder and then complete the cycle by returning to the point of origin for loading and unloading of the components.

A sequence control system using PLC programming provides the controls for moving a palette containing the plastic parts to be welded, positioning the parts in a pre-heat station, and then positioning the parts in the welding station. At each station, welding parameters (including time duration, light intensity, retaining force) are set and error messages indicate if any of the welding parameters are out of tolerance.

At the pre-heating station the plastic part temperatures are increased by about 50° C. This preheat has been determined for reservoir components made of polyethylene in both square and circular geometry's of 25 to 30 mm (per square side or diameter), Data obtained on preheat showed the following, small preheat produces excellent quality welds, but only a small reduction in weld time; a proper preheat (typically about 50° C.) results in the time reduction to weld the 3 mm thick infrared transparent polyethylene parts from nine to six seconds; and excessive preheat results in over-welded parts with visible distortion of the normally undisturbed exterior surface. If the preheat varies outside of the specified range (plus or minus 10° C.) around a predetermined temperature (which is adjustable depending on the plastic part geometry and material) then an error message will signal the system to stop.

After preheat, the conveyor transports the palette and plastic parts to the welding station. At this welding station, the plastic parts are lifted to position the parts under the welding lens. Three different welding lenses have been tested. These are: a thin laminated glass lens with an embedded gold, silver or aluminum mask; a machined quartz lens with aluminum coating mask; and light pipes up to two, inches in diameter with masks at the end to allow light only in the weld region. Data obtained on weld force has determined that 7 to 10 pounds provide highest quality welds for polyethylene. Lower forces result in incomplete welds around the periphery, and higher forces distort the normally clean exterior surface. Both the force magnitude, and duration of force are controlled. The part is raised by a pneumatic system to the lens were the predetermined force is applied. After the force is applied, then the welding lights are activated and the welding is commenced for a predetermined time. The PLC program controls both the force and the welding times, and if these are out of range then an error message detects the deviation. After the welding light is turned off the force application continues for one second and cooling air is applied to the welding lens for three seconds. The software allows different sequencing times depending on the plastic part geometry and materials.

Figure 8:
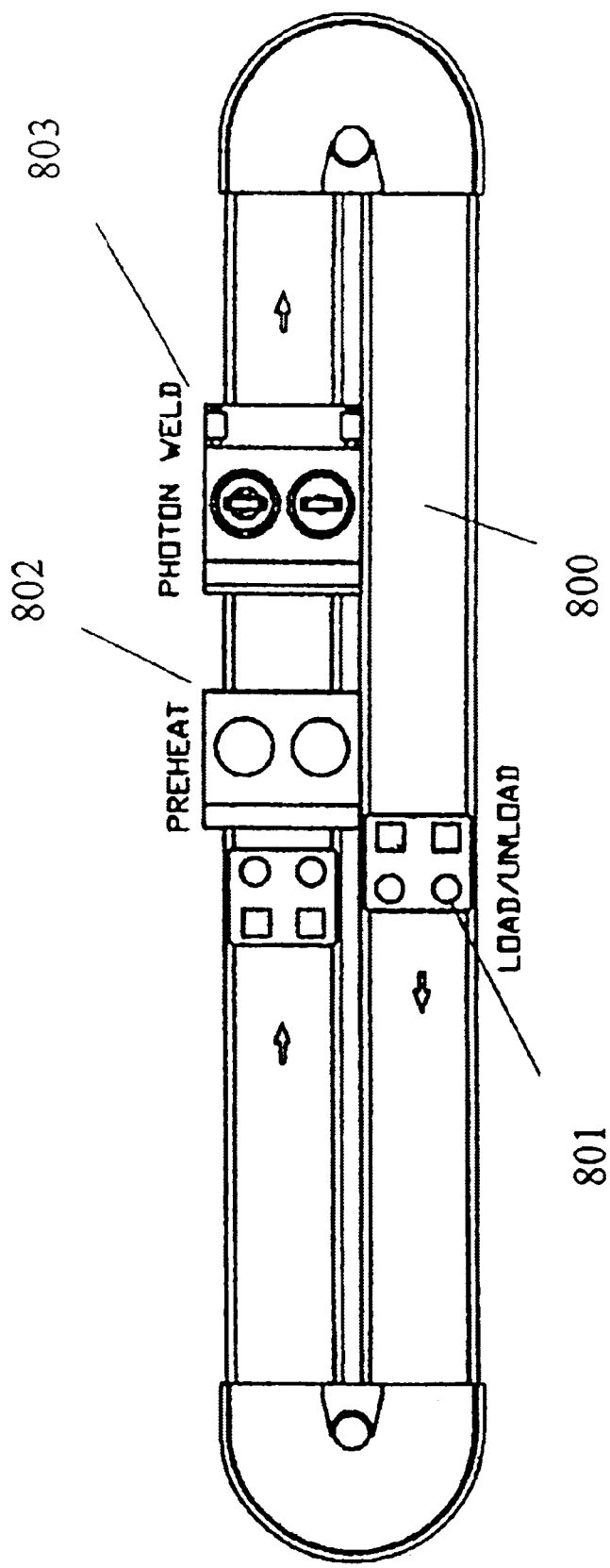
FIG. 8 is a top view of a fully automated conveyor system where plastic components are processed continuously under an apparatus similar to those described on FIGS. 1, 2, 6, and 7.
Figure 9:
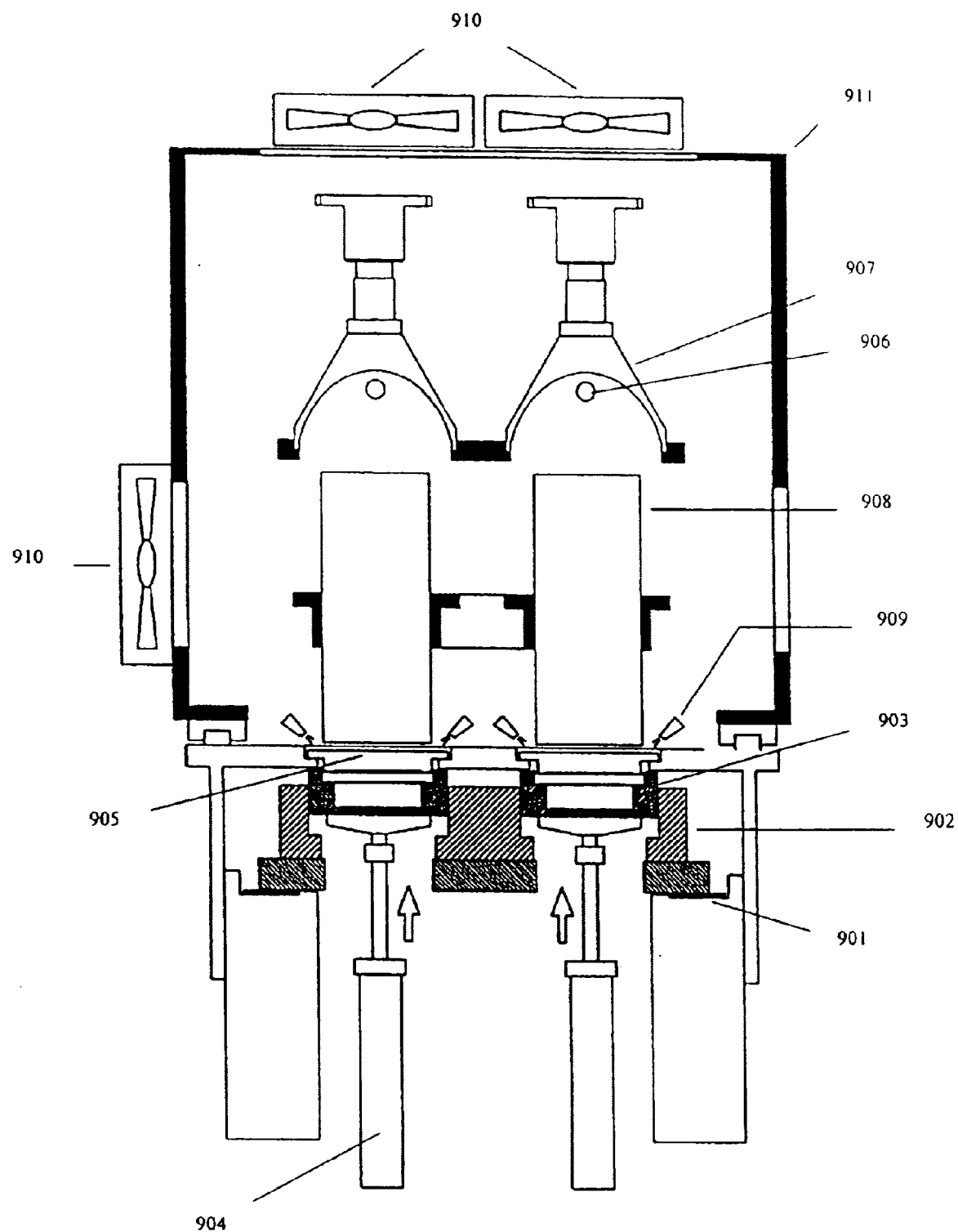
FIG. 9 is a cross-sectional view of a welding apparatus used on a system such as the one described in FIG. 8.
Figure 1B:
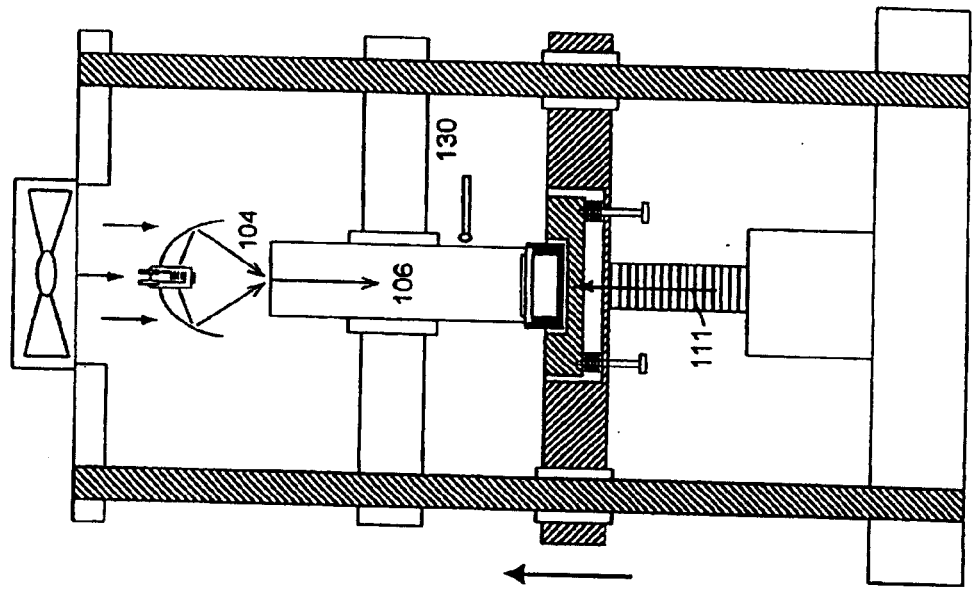
Figure 1A:
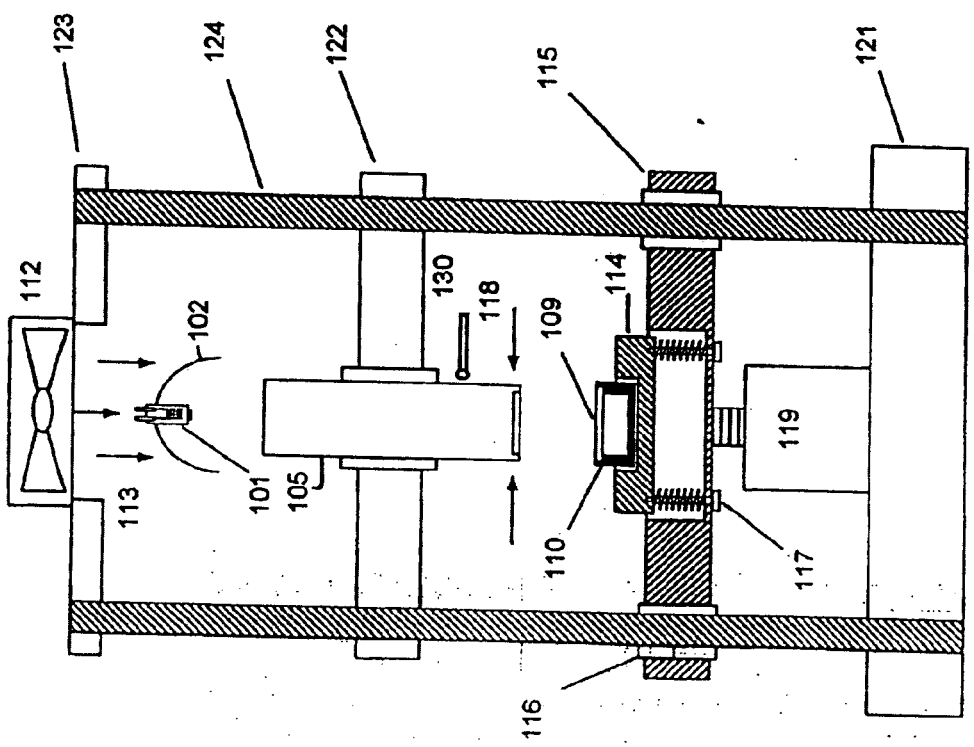

FIG. 9 shows a photon welder where a belt driven mechanism 901 such as the one described on FIG. 8, moves a nest 902 carrying unwelded components 903. Air driven pistons 904, push the unwelded components against a short light pipe 905. A moment later, quartz halogen lamps 906 contained within elliptical reflectors 907 are turned on for some pre-determined time controlled by a fully programmable control station (not shown). The light is then trapped by long cylindrical light pipes 908 which direct the light towards short light pipes 905 that have been masked with aluminum or gold to conform the areas of the parts to be welded, while the bonding takes place, a continuous stream of air cools both ends of the light pipes. The stream of air is provided by jets 909. Cooling for the reflectors and a chamber 911 where the light pipes and reflectors are contained is provided by the various fans 910. Upon completion of the weld, the pneumatic pistons retract allowing the welded components to be carried away by the nest 902.

Those skilled in the art realize that many other modifications may be made without departing from the spirit of this invention.

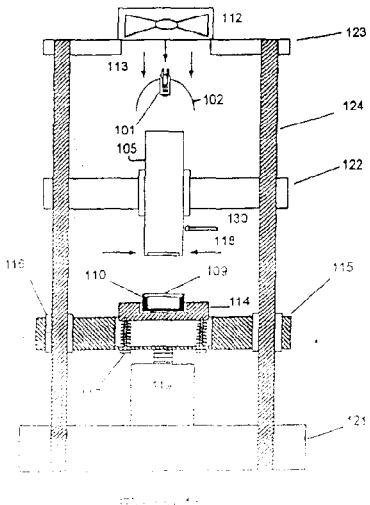

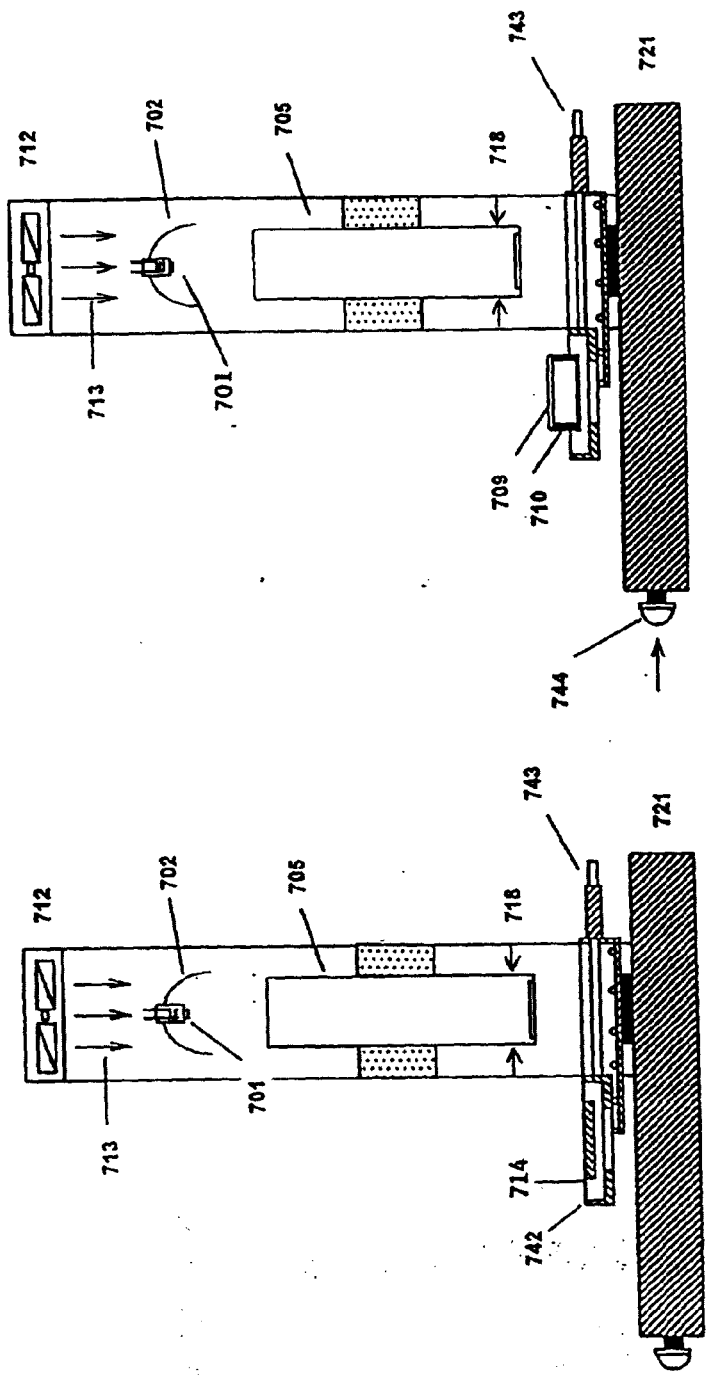

What is claimed is:

1. A photon welding apparatus for welding a work piece comprising a first component of transparent or transmissive plastic and a second component of absorbing plastic, comprising:
   a non-coherent photon source;
   a light pipe optically coupled to the photon source at one end to receive photons from the photon source and adapted to deliver the photons to its other end that is configured with a mask to allow the photons to exit the other end through an unmasked area to strike the workpiece in forming a weld between the components, the mask being a reflective coating on areas or the other end of the light pipe configured not to contact with the work piece;
   means for applying compressive force to the work piece during welding and a short time thereafter; and
   means for maintaining alignment of the light pipe, the first component and the second component during welding.

2. The apparatus of claim 1 where the photon source is a quartz halogen tungsten lamp or other suitable light sources.

3. The apparatus of claim 1 further comprising reflectors to optically couple the photon source to the light pipe.

4. The apparatus of claim 1, where a power level to the photon source and welding time interval are controlled.

5. The apparatus of claim 1, where cooling means are employed to reduce a welding cycle time.

6. The apparatus of claim 1, where the components to be welded are carried in a nest and the following sequence of automated steps occurs: the nested components move into the welding position, the light pipe with the mask contacts the first component of the work piece, the compressive force is applied to the work piece, the photon source is activated for prescribed interval, cooling means are activated when the light pipe overheats, after an appropriate delay period the compressive force is removed, the welded work piece is withdrawn from contact with the light pipe, and the work piece is removed from the nest.

7. An apparatus of claim 1, wherein the light pipe is comprised of silicon dioxide, glass or other suitable materials.

8. An apparatus of claim 1, wherein exiting photons from the light pipe strike the first component before striking the second component.

9. An apparatus of claim 1, wherein the first component is adapted to transmit striking photons.

10. An apparatus of claim 1, wherein the second component is adapted to absorb striking photons.

11. An apparatus of claim 1, wherein the second component is adapted to melt upon absorption of photons.

12. An apparatus of claim 1, wherein the second component is adapted to transmit heat sufficient to melt the first component.

13. An apparatus of claim 1, wherein the unmasked area defines a contact area between the other end of the light, pipe and the workpiece.

14. An apparatus of claim 13, wherein the weld is formed within the contact area.

15. A photon welding apparatus for joining one component, that is highly photon absorbing to another component that is highly photon transmissive, comprising:
   a non-coherent photon source which is held in place by a structural support which connects the non coherent photon source to a base;
   a movable plate which is designed to move the components to a masked end of a light pipe optically coupled to the photon source and to apply pressure to the components to be welded where pressure is applied by at least one of the following: levers, cams, pistons, linear actuators, springs and any other means that produce the same effect, wherein the light pipe is adapted to uniformly disperse light from the photon source over unmasked areas of the masked end of light pipe to irradiate the highly photon absorbing component which in turn conducts hear to the highly photon transmissive component when held under pressure; and
   means to assist in alignment of the components and the light pipe;
   means to cool the light pipe and the mask;
   a nest to align the components where the nest is connected to the movable plate; and
   timing means which times a radiation exposure, as well as the full cycle including post exposure hold and cooling.

16. The apparatus of claim 15, further comprising means to apply even pressure to the components where such means shall be selected from the group: set of springs, universal ball joint, floating pneumatic system, and floating hydraulic system.

17. An apparatus as in claim 15, further comprising multiple nests connected to the movable plate and a different mask and a different non-coherent photon source for each nest.

18. An apparatus as claimed in 15, further comprising means to monitor temperature of one selected from the group of: the light pipe, the mask, the components, and the reflector.

19. A method for photon welding a work piece comprising a first component of transparent or transmissive plastic and a second component of absorbing plastic, comprising:
   providing a non-coherent photon source;
   providing a light pipe and coupling the photon source to one end of the light pipe adapted to deliver the photons to its other end that is configured with a mask to allow the photons to exit the other end of the light pipe through an unmasked area to strike the workpiece in forming a weld between the components, the mask being a reflective coating on the other end of the light pipe not configured for contact with the work piece;
   applying a controlled, compressive force to the work piece during welding and a short time thereafter; and maintaining alignment of the light pipe, the first component and the second component during welding.

20. A method of claim 19, further comprising: preheating the work piece.

21. A method of claim 20, wherein the work piece is preheated to about 50° C.

22. A method of claim 20, wherein the work piece is preheated to about 110° C.

23. A method of claim 19, wherein the compressive force ranges between about 7–10 pounds.

24. A method of claim 19, wherein the components have a width ranging between about 25 to 30 mm and the compressive force is about 45 Newtons.

25. A method of claim 19, wherein welding time is about 10 seconds and post-weld time is about 5 seconds.

26. A photon welding apparatus for welding a work piece comprising a first component of transparent or transmissive plastic and a second component of absorbing plastic, comprising:

a non-coherent photon source;

a light pipe optically coupled to the photon source at one end to receive photons from the photon source and adapted to deliver the photons to its other end that is configured with a region in contact with the work piece, the other end having a mask to allow the photons to exit the other end of the light pipe through an unmasked area to strike the workpiece in forming a weld between the components, the mask being a reflective coating on a remaining region of the other end of the light pipe not in contact with the work piece; and wherein the weld is formed from photon absorption melting of the second component and convection or conductive melting of the first component.

27. An apparatus of claim 26, wherein the second component is configured with a cavity defined by a periphery and the weld is located along the periphery.

28. An apparatus of claim 27, wherein the periphery has a circular shape.

29. An apparatus of claim 27, wherein the periphery has a rectangular shape.

30. An apparatus of claim 27, wherein the periphery has a L-shaped recess or a butt joint.

31. An apparatus of claim 26, further comprising cooling means to cool the other end of the light pipe.

32. An apparatus of claim 31, further comprising a temperature sensor to monitor temperature of the other end of the light pipe and activate the cooling means.

33. An apparatus of claim 31, wherein the cooling means comprise a heat dissipater or heat sink.

34. An apparatus of claim 31, wherein the cooling means comprise a water cooled heat exchanger.

35. An apparatus of claim 31, wherein the cooling means comprise heat pipes.

36. An apparatus of claim 31, wherein the cooling means comprise an annulus providing compressed air.

37. An apparatus of claim 26, further comprising a reflector to direct the photons from the photon source to the one end of the light pipe.

38. An apparatus of claim 37, further comprising cooling means to cool the reflector.

39. An apparatus of claim 38, further comprising a temperature sensor to monitor temperature of the reflector and activate the cooling means.

40. An apparatus of claim 26, wherein the photon source comprises a quartz halogen tungsten lamp.

41. An apparatus of claim 40, wherein the lamp exhibits a spectra peaking in the infrared at about 1000 nm for filament temperatures of about 3000 K.

42. An apparatus of claim 26, wherein the mask comprises one of the following: gold, silver, aluminum and chrome.

43. An apparatus of claim 26, wherein a weld time is about 10 seconds and a post-weld time is about 4 seconds.

44. An apparatus of claim 26, wherein the photon source is a quartz-halogen tungsten lamp with a poser range between about 410 to 1000 watts.

45. An apparatus of claim 26, wherein the light pipe comprises a thin laminated glass lense and the mask comprises embedded gold, silver or aluminum.

46. An apparatus of claim 26, wherein the light pipe comprises a machined quartz lense and the mask comprises an aluminum coating.

47. An apparatus of claim 26, wherein the light pipe has a diameter no greater than two inches.

48. A photon welding apparatus for welding a work piece comprising a first component of transparent or transmissive plastic and a second component of absorbing plastic, comprising:

a non-coherent photon source;

a light pipe optically coupled to the photon source at one end to receive photons from the photon source and adapted to deliver the photons to its other end that is configured with a region in contact with the work piece, the other end having a mask to allow the photons to exit the other end of the light pipe through an unmasked area to strike the workpiece in forming a weld between the components; and wherein the weld is formed from photon absorption melting of the second component and convection or conductive melting of the first component.

* * * * *

UNITED STATES PATENT AND TRADEMARK OFFICE
CERTIFICATE OF CORRECTION

PATENT NO. : 6,911,108 B2
APPLICATION NO. : 10/037414
DATED : June 28, 2005
INVENTOR(S) : Sarmiento It is certified that error appears in the above-identified patent and that said Letters Patent is hereby corrected as shown below:

Title page consisting of Fig 1a should be deleted and replaced with the attached title page

In the Drawings

| | |
|---|---|
| FIG. 1a, Sheet 1 of 12 | Delete Drawing Sheet 1 and substitute therefore the Drawing Sheet, consisting of Figs. 1a and 1b, as shown on the attached page |
| Fig. 7a, Sheet 7 of 12 | Delete Drawing Sheet 7 and substitute therefore the Drawing Sheet, consisting of Figs. 7a and 7b, as shown on the attached page |

In the Claims

| | |
|---|---|
| Column 9, line 36, Claim 1 | Delete "or", Insert --of-- |
| Column 9, line 57, Claim 6, | Before "prescribed interval", Insert --a-- |
| Column 10, line 11, Claim 13 | Delete "," |
| Column 10, line 16, Claim 15 | Delete "," |
| Column 10, line 19, Claim 15 | Delete "non coherent", Insert --non-coherent-- |
| Column 10, line 31, Claim 15 | Delete "hear", Insert --heat-- |
| Column 10, line 40, Claim 16 | Delete "The apparatus of claim 15,", Insert --An apparatus as in claim 15,-- |

UNITED STATES PATENT AND TRADEMARK OFFICE
CERTIFICATE OF CORRECTION

PATENT NO. : 6,911,108 B2
APPLICATION NO. : 10/037414
DATED : June 28, 2005
INVENTOR(S) : Sarmiento It is certified that error appears in the above-identified patent and that said Letters Patent is hereby corrected as shown below:

| | |
|---|---|
| Column 12, line 19, Claim 42 | Delete "and", Insert --or-- |
| Column 12, line 23, Claim 44 | Delete "poser", Insert --power-- |
| Column 12, line 26, Claim 45 | Delete "lense", Insert --lens-- |
| Column 12, line 29, Claim 46 | Delete "lense", Insert --lens-- |

Signed and Sealed this

Third Day of October, 2006

JON W. DUDAS
*Director of the United States Patent and Trademark Office*

(12) United States Patent
Sarmiento

(10) Patent No.: US 6,911,108 B2
(45) Date of Patent: Jun. 28, 2005

(54) PHOTON WELDING DEVICES FOR JOINING PLASTIC PARTS

(75) Inventor: Pedro A. Sarmiento, San Diego, CA (US)

(73) Assignee: Quantum Group, Inc., San Diego, CA (US)

( * ) Notice: Subject to any disclaimer, the term of this patent is extended or adjusted under 35 U.S.C. 154(b) by 0 days.

(21) Appl. No.: 10/037,414

(22) Filed: Jan. 4, 2002

(65) Prior Publication Data
US 2003/0094240 A1 May 22, 2003

Related U.S. Application Data
(60) Provisional application No. 60/260,012, filed on Jan. 6, 2001.

(51) Int. Cl.$^7$ ............................................. B32B 31/20
(52) U.S. Cl. ........................... 156/272.2; 156/379.8; 156/580; 219/243; 219/385
(58) Field of Search ..................... 156/379.6, 379.8, 156/580, 272.2; 219/243, 385; 250/504 R; 362/551, 580, 581

(56) References Cited
U.S. PATENT DOCUMENTS

| | | | |
|---|---|---|---|
| 4,233,493 A | * | 11/1980 | Nath ............................ 606/16 |
| 4,636,609 A | | 1/1987 | Nakamata |
| 5,278,731 A | * | 1/1994 | Davenport et al. ......... 362/551 |
| 5,426,308 A | * | 6/1995 | Sudduth et al. ......... 250/504 H |
| 5,840,147 A | | 11/1998 | Grimm |
| 5,843,265 A | | 12/1998 | Grimm |
| 6,596,122 B1 | * | 7/2003 | Savitski et al. .......... 156/304.2 |

* cited by examiner

Primary Examiner—John T. Haran
(74) Attorney, Agent, or Firm—Christie, Parker & Hale, LLP

(57) ABSTRACT

Photon welding devices of this invention comprise a non-coherent photon source, and a light pipe coupled to the photon source at one end. A thin mask is positioned at another end of the light pipe that defines a weld location for photon delivery. A work piece to be bonded by the device comprises a top layer of transparent plastic and a base layer of absorbing plastic. The thin mask is in the form of a reflective coating positioned on the end of the light pipe over all surfaces that are not in contact with the work piece. A device includes a member that imposes a controlled, compressive force to the work piece while it is being welded and during a short time thereafter. The device also includes a member that maintains a desired alignment of the light pipe, top layer of the work piece, and base layer of the work piece during the bonding cycle.

48 Claims, 12 Drawing Sheets